United States Patent [19]

Del Giudice et al.

[11] Patent Number: 4,713,416

[45] Date of Patent: Dec. 15, 1987

[54] THERMOPLASTIC COMPOSITIONS INCLUDING POLYPHENYLENETHER, HAVING IMPROVED IMPACT STRENGTH AND PROCESSABILITY CHARACTERISTICS

[75] Inventors: Luciano Del Giudice, Milan; Roberto Nocci, Novara; Umberto Giannini, Milan; Giuseppe Gianotti, Novara, all of Italy

[73] Assignee: Montedison S.p.A., Milan, Italy

[21] Appl. No.: 671,314

[22] Filed: Nov. 14, 1984

[30] Foreign Application Priority Data

Nov. 15, 1983 [IT] Italy ................. 23717 A/83

[51] Int. Cl.$^4$ .................. C08L 61/04; C08L 71/04
[52] U.S. Cl. .................. 525/68; 525/70; 525/92; 525/905
[58] Field of Search .................. 525/68, 905

[56] References Cited

U.S. PATENT DOCUMENTS

| | | | |
|---|---|---|---|
| 3,361,851 | 2/1968 | Gowan | 260/897 |
| 3,383,436 | 5/1968 | Larrison | 260/928 |
| 4,282,335 | 8/1981 | Sugio et al. | 525/68 |
| 4,373,045 | 2/1983 | Cooper et al. | 525/68 |
| 4,460,743 | 7/1984 | Abe et al. | 525/68 |

*Primary Examiner*—Jacob Ziegler
*Attorney, Agent, or Firm*—Stevens, Davis, Miller & Mosher

[57] ABSTRACT

Thermoplastic compositions based on polyphenylenether resins, endowed with improved mechanical, thermal and solvent-resistance characteristics, comprising, for 100 parts by weight of polyphenylenether resin:

(a) from 0 to 90 parts by weight of a thermoplastic polymer other than polystyrene and incompatible with the polyphenylenether resin, and (b) from 1 to 90 parts by weight of a polymeric compatibility-promoting agent comprising one or more blocks of vinylacromatic monomeric units compatible with the polyphenylenether resin, and one or more blocks of monomeric units of the same nature as the thermoplastic polymer (a), or compatible with that polymer.

2 Claims, No Drawings

THERMOPLASTIC COMPOSITIONS INCLUDING POLYPHENYLENETHER, HAVING IMPROVED IMPACT STRENGTH AND PROCESSABILITY CHARACTERISTICS

BACKGROUND OF THE INVENTION

It is known from U.S. Pat. No. 3,383,436 that polyphenylenether resins are compatible in all proportions with polystyrene: the addition of polystyrene has chiefly the consequence of improving the hot processability characteristics of polyphenylenether.

It is known as well that the polyphenylenether resins are not compatible to an appreciable extent with thermoplastic resins different from polystyrene.

It is known, for example from U.S. Pat. No. 3,361,851, that polypropylene can be incorporated into polyphenylenether in amounts up to about 10% by weight. However, the addition of amounts exceeding 10% causes a phase separation with consequent lamination phenomena in the molded articles.

When polyethylene is incorporated into polyphenylenether, the melt-flow index and a few physical properties are considerably improved, but the amount of polyethylene that can be incorporated reaches at the most to about 5% by weight. Higher amounts than 5% cause lamination phenomena and an excessive brittleness.

Lastly, it is known that it is possible to incorporate amounts of polyolefin higher than those indicated herein when using, as compatibility-promoting agents, elastomeric block copolymers of type A B A', in which A and A', like or unlike each other, are blocks of vinylaromatic monomers and B is a block of a conjugated diolefin.

Also in this case, however, the amount of polyolefin that can be incorporated is rather low: the sum of the polyolefin amount and of the elastomeric copolymer amount does not exceed in fact 30% by weight.

Higher polyolefin amounts than those mentioned above lead, also in this case, to a phase separation and to consequent lamination phenomena.

THE PRESENT INVENTION

We have now surprisingly found that it is possible to prepare, practically in all proportions, homogeneous mixes of polyphenylether resins with thermoplastic copolymers other than polystyrene and incompatible with the polyphenylenether resins, in particular crystalline polymers of the olefins, by using, as compatibility-promoting agents, particular groups of substances.

The action of such compatibility-promoting agents is essentially that of promoting the interface adhesion among the components of the mix, not obtainable otherwise. Due to such adhesion it is possible to prepare, depending on the processing conditions, very homogeneous mixes having valuable mechanical and thermal properties.

In the case of the crystalline olefin polymers, the compatability-promoting agents are selected from among: (a) the block copolymers consisting of, or comprising a block AB, in which A is a block of units derived from a vinylaromatic monomer, B is a crystalline block deriving from an olefin $C_2$-$C_6$, and (b) the products obtained by grafting a vinylaromatic monomer onto a crystalline polymer of an olefin $C_2$-$C_6$. Preferably, there are used isotactic polystyrene/isotactic polypropylene two-block copolymers prepared according to the pending U.S. application of Roberto Nocci et al, Ser. No. 513,630, filed July 14, 1983, now abandoned, preferably containing from 30 to 60% by weight of propylene. The rough, or crude, total products of the copolymerization reaction are usefully employable without proceeding to the separation and purification of the copolymer.

In the case of graftings of polystyrene onto polyolefins, products obtained by grafting onto isotactic polypropylene or onto polyethylene are preferably utilized. The use of polypropylene modified with ethylene/propylene rubbers permits to further improve the impact strength properties of the compositions.

The products obtained by grafting vinylaromatic monomers onto olefinic polymers, utilized for the compositions of the present invention, are obtainable, according to conventional techniques, by reacting the vinyl monomer with the olefin polymer in the dispersed, emulsified or dissolved state, either or not in the presence of peroxy starters or of other starters (initiators) of free radicals.

In the case of the thermoplastic polymers different from polyolefins, the compatibility-promoting agents are: (c) the block copolymers containing one or more units deriving from a vinylaromatic monomer and one or more blocks of units or monomers which are reactive with and/or compatible with or of the same kind, in the polymeric state, as the thermoplastic polymer, and (d) the polymers of the vinylaromatic monomers modified by insertion of monomer units, as defined hereinabove, into the chain.

Some examples of these compatibility-promoting agents are the polystyrene containing, in the copolymerized state, from 5 to 90% of units deriving from caprolactone, acrylonitrile, maleic anhydride, and preferably from 5 to 20% for the last two. The use of these modified polystyrenes renders polymers, such as polycarbonates, aromatic polyesters and polyamides, compatible with the polyphenylenether.

The polyphenylenethers to which the present invention relates are polymers and copolymers including repeating units represented by the formula:

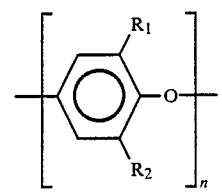

in which the ethereal oxygen of a unit is bound to the benzene ring of the adjacent unit, n is an integer higher than 50, $R_1$ and $R_2$, like or unlike each other, are hydrogen, halogens, hydrocarbon radicals free from tertiary carbon atoms in alpha position, halohydrocarbon or halohydrocarboxylic radicals containing at least two carbon atoms between the benzene nucleus and the halogen atom, and free from tertiary carbon atoms in alpha position.

Preferred polyphenylenethers are those having an alkyl substituent with 1-4 C in the ortho position with respect to oxygen. The most preferred one is poly-(2,6-dimethyl-1,4-phenylen)-ether.

The term "polyphenylenethers" includes also copolymers prevailingly consisting of the units covered by the general formula indicated hereinabove, obtained by copolymerization with alkyl-substituted phenols, typical examples thereof being 2,3,6-trimethylphenol and 2,3,5,6-tetramethylphenol.

The term "polyphenylenethers" means also modified polyphenylenethers such as, for example, the polymers modified with alkylbenzene-formaldehyde resins comprising, as a main block, a block having the polyphenylenether structure as defined hereinbefore and a block obtained by reacting an alkylbenzeneformaldehyde resin with an alkylphenol, and the polyphenylenethers obtained by grafting vinylaromatic monomers onto polyphenylenethers.

The crystalline polymers of the olefins are polymers of olefins $CH_2=CHR$ in which R is hydrogen or an alkyl radical with 1 to 4 C. They include in particular polypropylene, high density and low density polyethylene, copolymers of ethylene with minor proportions of alpha-olefins such as butene, hexene, octene. Examples of such polymers are polybutene, poly-4-methyl-pentene-1, copolymers of propylene with minor proportions of ethylene and/or an alpha-olefin. The definition "crystalline polymers of the olefins" includes also compositions comprising polypropylene having a high isotacticity index and ethylene/propylene rubbers, obtained by mechanical blending or by direct synthesis according to conventional processes in which, in a first step, propylene is polymerized to isotactic polypropylene and, in a second step, propylene and ethylene mixtures are polymerized.

Polypropylene having an isotacticity index higher than 90% and impact-proof polypropylene consisting of the compositions based on isotactic polypropylene and of ethylenepropylene rubbers, mentioned hereinbefore, in which the rubber content generally ranges from 10 to 20% are preferably employed.

The polycarbonates utilized in preparing the compositions according to the invention have generally the formula:

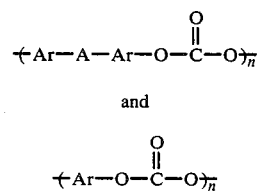

wherein:
Ar=phenylene containing at least 6 and preferably from 6 to 12 carbon atoms, or alkyl-, alkoxyl-, halogen-, and nitrosubstituted phenylene;
A=alkylidene, cycloalkylidene, alkylene, cycloalkylene containing from 1 to 12 carbon atoms an azo, imino, sulpho, oxygen, sulphoxide or sulphone group;
n=an integer equal to at least 2.

The preparation of such polycarbonates is a well known technique.

The preferred polycarbonate is obtained when Ar is p-phenylene and A is isopropylidene. This polycarbonate is prepared by reacting p,p'-isopropylidendiphenol with phosgene.

Other polycarbonates are prepared by reacting other dihydroxy-compounds, or mixtures thereof, with phosgene. The dihydroxy-compounds may include aliphatic dihydroxy-compounds, although aromatic rings are preferred due to their higher thermal characteristics. The dihydroxy-compounds may comprise diurethane bonds in the structure. A portion of the structure may be substituted by siloxane bonds.

The polyester resins utilizable in the compositions according to this invention are the thermoplastic polyester resins having a generally crystalline structure, the higher melting point thereof being at about 120° C. A particularly useful group of such resins is composed of the polyesters prepared by condensing a bicarboxylic acid, or a lower alkyl ester thereof, or a halide thereof or the anhydride thereof, with a glycol according to conventional methods. The aromatic or aliphatic bicarboxylic acids suitable for preparing the polyesters include the oxalic, malonic, succinic, glutaric, adipic, suberic, azelaic, sebacic, terephthalic, isophthalic, p-carboxyphenoacetic, p-carboxyphenoxyacetic, p-carboxyphenoxypropionic, p-carboxyphenoxybutyric, p-carboxyphenoxyvalerianic, p-carboxyphenoxyhexanoic, 3-alkyl-4-(beta-carboxyethoxy)benzoic, 2,6-naphthalendicarboxylic, 2,7-naphthalendicarboxylic acids, and furthermore p,p'-dicarboxydiphenyl, p,p'-dicarboxydiphenylsulphone, and mixtures thereof.

Glycols which are suitable for preparing polyesters utilizable for the compositions of the invention include linear alkylene glycols containing from 2 to 12 carbon atoms, such as ethylene glycol, 1,3-propylene glycol, 1,6-hexylene glycol, 1,10-decamethylene glycol, 1,12-dodecamethylene glycol and the like, in whole or in part substituted by aromatic glycols, such as p-xylilene glycol, pyrocatechol, resorcinol, hydroquinone, 1,4-cyclohexane dimethanol, and their possible substituted alkyl derivatives.

Preferred polyesters are polyethyleneterephthalate, polypropyleneterephthalate and polybutyleneterephthalate. Other useful polyesters are the thermoplastic cellulose esters, such as cellulose nitrate, acetate, propionate, butyrate and acetatebutyrate, hydroxyethyl cellulose, ethyl cellulose, carboxymethyl cellulose and acetylated hydroxyethyl cellulose.

Other useful polyesters are polypivalolactone, polycaprolactone, typical representatives of which are the poly (ε-caprolactones).

As suitable polyamides for use in the compositions of the present invention there may be cited those which are generally known as "nylon" and which are usually prepared by polymerization of monoaminomonocarboxylic acids or of internal lactams thereof, containing at least 2 carbon atoms between the carboxylic group and the aminic group; or those obtained by polymerizing about equimolar portions of a diamine containing at least two carbon atoms among the aminic groups, with a bicarboxylic acid; or by polymerizing a monoamino carboxylic acid or a lactam thereof, as defined hereinbefore, with about equimolecular amounts of diamine and bicarboxylic acid.

Suitable monoaminocarboxylic acids or lactams are those containing from 2 to 16 carbon atoms between the —$NH_2$ and —COOH groups; for example the ε-aminocaproic, 3- and 4-aminobenzoic acids, butyrolactam, pivolactam, caprolactam, capryllactam, enantolactam, undecanelactam, dodecanelactam.

Examples of diamines are given by the diamines of general formula $H_2N—(CH_2)_n—NH_2$, wherein n is an integer from 2 to 16, such as for example trimethylene diamine, tetramethylene diamine, pentamethylene diamine, hexamethylene diamine, octamethylene diamine, hexadecamethylene diamine.

Other examples of diamines are given by the abovesaid diamines containing alkyl substituents on the carbon atoms, besides by aromatic diamines such as p-phenylene diamine, 4,4'-diaminodiphenylsulphone, 4,4'-diaminodiphenylether, 4,4'-diaminodiphenylmethane, and by cycloaliphatic diamines such as diamino dicyclohexylmethane.

The bicarboxylic acids may be aromatic, such as isophthalic and terephthalic acids. Preferred bicarboxylic acids are oxalic acid and the acids of formula HOOC—Y—COOH, wherein Y is a divalent aliphatic radical containing at least 2 carbon atoms, such as e.g., sebacic, adipic, pimelic, glutaric, azelaic, undecanoic, suberic, octadecanoic acids.

The polyarylethers employable according to the present invention comprise the linear thermoplastic polymers formed by repeating units of the type:

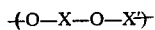

wherein X is the residue of a dihydric phenol of the type:

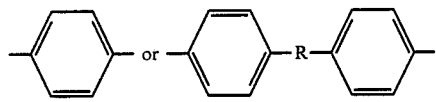

in which R may be a bond between two carbon atoms, or —O—, —S—, —S—S—, a divalent hydrocarbon radical containing from 1 to 18 carbon atoms, and X' is the residue of a bromine compound or of an iodobenzenoid compound of the type:

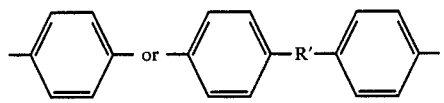

wherein R' has the same value as defined hereinbefore for R, provided that when R is —O—, R' is different from —O—, and vice-versa:

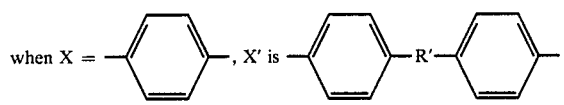

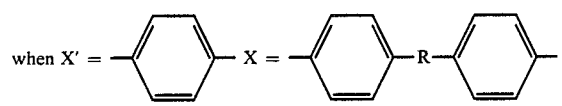

Such polyethers can be prepared according to the method described in U.S. Pat. No. 3,332,909.

In the case of the polyarylethers, the suitable compatibility-promoting agents are selected from the polystyrene/polyolefins block copolymers and the products obtained by grafting styrene onto polyolefins.

It has also been found—this being a further aspect of the invention—that the particular compatability-promoting agents utilized in the compositions forming the object of the present invention are by themselves modifiers of the properties of the polyphenylenether resins in the sense that the addition to such resins improves both the impact strength characteristics and the processability properties thereof.

It has been found in particular that the isotactic polystyrene-isotactic polypropylene two-block copolymers containing preferably from 30 to 60% of propylene and the grafting products of styrene onto isotactic polypropylene or isotactic polypropylene modified with rubbers $C_2$-$C_3$ improve the impact strength properties of the polyphenylenether resins already in relatively small additions (10–20% by weight calculated on the resin).

Generally, the compositions of the invention comprise, as already mentioned, the polyphenylenether resin and, referred to such resin:
(a) from 0 to 90% by weight and preferably from 5 to 90% by weight of a thermoplastic polymer, different from polystyrene, incompatible with said resin, and
(b) from 1 to 90%, preferably from 10 to 40%, by weight of the compatibility-promoting agent.

The compositions may furthermore include plasticizers (which improve the mixing of the components and contribute to prevention of the phase separation). Generally, any plasticizer compatible with the components of the mixes can be usefully employed. Typical examples of such plasticizers are chlorinated bisphenols, mineral oils and phosphates. Triphenylphosphate is the preferred plasticizer. Generally, from 5 to 15% by weight of plasticizer is utilized, based on the weight of the total composition.

Higher amounts negatively affect the stiffness and the distortion temperature of the compositions.

The compositions may also include polystyrene homopolymer or random copolymer and, more preferably, impact resistant polystyrene. Generally, the amount of polystyrene polymer is comprised between 10 and 90% by weight referred to the polyphenylenether resin.

Preferred compositions include the following weight percentages referred to the polyphenylenether resin:
0–50% of a thermoplastic polymer different from polystyrene and incompatible with the resin;
5–20% of the compatibility-promoting agent;
0–50% of impact-proof (high impact strength) polystyrene.

The compositions are prepared by mixing the components according to known methods. For example, it is possible to dissolve the polymeric components in a solvent and then to cause them to precipitate by adding an excess of methanol to the solution. The polymeric mixture so obtained is additioned with the stabilizers and the other additives, if any, and is then granulated.

Or it is possible to mechanically mix the polymeric components in a common mixer, to add the stabilizers and the possible other additives to the mixture and to extrude the mix in a single-screw extruder.

In the following table there are illustrated ten compositions according to the invention, prepared by extrusion of the granulated mixture of the polymeric components, previously stabilized by addition of about 0.3% by weight of IRGANOX 1010 and of about 0.2% by weight of BHT, by means of a RHECORD HAAK extruder equipped with a double-stage screw RC 1:3-1:2 with 16 rpm, and with a head with a 1/16" nozzle, and operating at temperatures between 260° and 280° C.

The characteristics of the compositions have been determined on specimens prepared by injection molding in a press, at temperatures from 280° to 300° C. according to the following standards:

| Thermal properties: | (HDT) according to ASTM D 648 standard; |
|---|---|
| Mechanical properties under tension (tensile stress, elongation modulus): | according to ASTM D 638 standard, condition C; |
| Impact strength under tension (Izod): | ASTM D 256 standard. |

Composition No. 11 refers to a commercial product and is indicated in the table by way of comparison.

TABLE

| | Composition | | | | Compatibility-promoting agent | |
|---|---|---|---|---|---|---|
| | PPO | | | | | |
| Example | % by weight | 2nd Component | | % by weight | Type | % by weight |
| 1 | 50 | HDPE* | | 50 | — | — |
| 2 | 60 | HDPE* | | 30 | PS/PE grafted copolymer (55/45) | 10 |
| 3 | 60 | PP Domus** | | 40 | — | — |
| 4 | 39 | PP FL20** | | 50 | PS/PP two-block copolym. (40/60) | 11 |
| 5 | 60 | PP MO/S 30S** | | 30 | PS/PP two-block copolym. (40/60) | 10 |
| 6 | 60 | PP MO/S 30S** | | 30 | PS/PP grafted copolymer (30/70) | 10 |
| 7 | 60 | EPT 30M copolymer*** | | 30 | PS/PP grafted copolymer (30/70) | 10 |
| 8 | 60 | PP MO/S 30S** | | 37 | Polystyrene (Edistir NL 20100 produced by Montedison) | 3 |
| 9 | 87 | PS/PP two-block copolymer (40/60) | | 13 | — | — |
| 10 | 87 | PS/PP grafted copolymer (30/70) | | 13 | — | — |
| 11 (comparison) | ~50 | Impact-proof polystyrene | | ~50 | — | — |

| | | CHARACTERISTICS | | | | |
|---|---|---|---|---|---|---|
| | E | σB | εB | Izod Impact Strength | | HDT 1.82 M Pa. |
| Example | M Pa. | M Pa. | % | With Notch kg·cm/cm | Without Notch kg·cm/cm | °C. |
| 1 | 1700 | 42 | 15 | 7 | 30 | 115 |
| 2 | 2000 | 52 | 12 | 7 | 35 | 135 |
| 3 | 1600 | 35 | 6 | 3 | 10 | 125 |
| 4 | 2000 | 34 | 8 | 4 | 10 | 90 |
| 5 | 2400 | 49 | 7 | 5 | 14 | 125 |
| 6 | 2200 | 52 | 12 | 6 | 20 | 140 |
| 7 | 2500 | 50 | 11 | 7 | 35 | 140 |
| 8 | 1600 | 50 | 10 | 3 | 30 | 135 |
| 9 | 2000 | 65 | 9 | 17 | 80 | 160 |
| 10 | 2000 | 69 | 10 | 13 | 65 | 158 |
| 11 (comparison) | 2200 | 52 | 20 | 15 | — | 125 |

Remarks to the Table:
*high-density polyethylene
**polypropylene produced by Montedison
***polypropylene modified with ethylene/propylene rubbers produced by Montedison
PS polystyrene
PE polyethylene
PPO poly-2,6-dimethyl-1,4-phenylenether having [η] at 30° C. in toluene equal to 0.57
E modulus
σB tensile stress
εB elongation at break
HDT hot distortion temperature Where ranges of values are given herein the extremes are included.

We claim:

1. A thermoplastic composition consisting essentially of 60% by weight of poly-2,6-dimethyl-1,4 phenylenether, 30% by weight of a blend of polypropylene with an ethylene/propylene rubber and 10% by weight of a graft copolymer of styrene onto polypropylene.

2. A thermoplastic component based on polyphenylenether resins and comprising, for 100 parts by weight of the polyphenylenether resin:
   (a) from 5 to 90 parts by weight of a blend of polypropylene with ethylene/propylene rubber; and,
   (b) from 1 to 90 parts by weight of a graft copolymer of styrene onto polypropylene.

* * * * *